Figure 1:
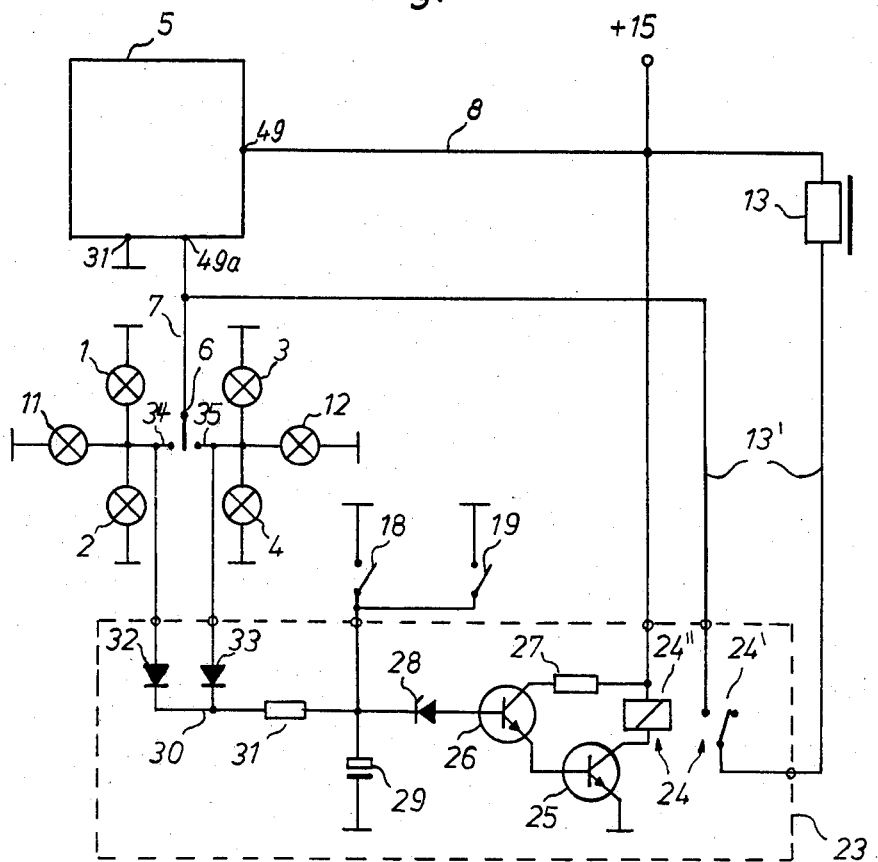

United States Patent [19]

Lobe et al.

[11] 4,241,328
[45] Dec. 23, 1980

[54] CIRCUIT ARRANGEMENT FOR TURN-INDICATOR BLINKER LIGHTS

[75] Inventors: Hartwig Lobe, Unterschleissheim; Wolfgang Dietz, Munich, both of Fed. Rep. of Germany

[73] Assignee: Bayerische Motoren Werke Aktiengesellschaft, Fed. Rep. of Germany

[21] Appl. No.: 864,254

[22] Filed: Dec. 27, 1977

[30] Foreign Application Priority Data

Nov. 11, 1977 [DE] Fed. Rep. of Germany ....... 2750558

[51] Int. Cl.² .......................... B60Q 1/00; B60Q 1/34
[52] U.S. Cl. .................................. 340/75; 340/52 D
[58] Field of Search ..................... 340/75, 56, 73, 52 D

[56] References Cited

U.S. PATENT DOCUMENTS

| 3,376,548 | 4/1968 | Jabbar et al. | 340/52 D |
| 3,445,810 | 5/1969 | Donohoo | 340/56 |
| 3,806,868 | 4/1974 | Portman | 340/56 |
| 3,878,508 | 4/1975 | Suzuki | 340/56 |
| 3,964,019 | 6/1976 | Wethe et al. | 340/52 D |

OTHER PUBLICATIONS

"Auto Turnsignals," *BIGBIKE*, Jun. 1977, pp. 12;13.

Primary Examiner—Donald J. Yusko
Attorney, Agent, or Firm—Craig and Antonelli

[57] ABSTRACT

A circuit arrangement for the turn-indicator blinker lights of a motor vehicle, especially of a motorcycle, with an acoustic control device coordinated to the operation of the blinker lights; the control device is disconnected when the force-transmission of the motor vehicle is interrupted, while a time control switch engages the control device with a predetermined delay after the beginning of the operation of the blinker light when the force-transmission is engaged and/or after the force-transmission has been re-engaged during the operation of the blinker-lights.

11 Claims, 2 Drawing Figures

CIRCUIT ARRANGEMENT FOR TURN-INDICATOR BLINKER LIGHTS

The present invention relates to a circuit arrangement for the turn-indicator blinker lights of a motor vehicle, especially of a motorcycle, with an acoustic control device coordinated to the operation of the blinker lights.

A circuit arrangement of this type is known in the prior art, in which the acoustic control device is disconnected up to a predetermined minimum velocity (German Offenlegungsschrift 2,506,407). A complicated electronic circuit arrangement is necessary therefor, in which preferably the output signal of a tachometer effects the turning on and off of the acoustic control device.

Furthermore, it is known from the German Pat. No. 853,858 to always engage an acoustic control device with a delay after the engagement of the blinker lights. However, in that case the disconnection or turning off of the control device takes place exclusively together with the blinker lights. A disconnection during standstill of the motor vehicle is not provided in this prior art arrangement.

The present invention is concerned with the task to disconnect or turn off the acoustic control device with simple circuit means, if the operation thereof which is annoying for bystanders, is not required, but which engages the acoustic control device if it is certain with a high degree of probability that the timely disengagement or turning off of the blinker lights has been overlooked.

The underlying problems are solved according to the present invention in that the control device is disconnected with an interrupted force-transmission of the motor vehicle and in that a time-control switch engages the control device with delay after the beginning of the operation of the blinker lights with a closed force-transmission and/or after the closing of the force-transmission during the operation of the blinker lights.

The acoustic control device is disconnected with an interrupted force-transmission, for example, with a motor vehicle stopped at an intersection, and by the time-control switch immediately after the engagement of the blinker lights and after the closing of the force-transmission during the switching period of the time-control switch. The switching period is, for example, equal to the average period for a change in the driving direction.

The control device may be disengaged or turned-off with a disengaged clutch or in the alternative with an engaged neutral position of the transmission. The turning-off or disconnection with a disengaged clutch offers the advantage that the interruption of the operation of the control device enhances the reminder of the engaged blinker lights during a speed change.

A particularly simple construction of the present invention with respect to the circuit thereof resides in that the time-control switch includes a condenser which is charged during the operation of the blinker lights and which is discharged with an interrupted force-transmission and whose voltage above a predetermined threshold value controls the closing of an energizing circuit for the control device.

The condenser may control a control transistor for a switching or power transistor by way of a Zener diode as threshold switch, whereby the energizing coil of a relay for the control device is connected in the collector circuit of the switching transistor.

Accordingly, it is an object of the present invention to provide a circuit arrangement for the turn-indicator blinker lights of motor vehicles, especially motorcycles, which avoids by simple means the aforementioned shortcomings and drawbacks encountered in the prior art.

Another object of the present invention resides in a control circuit for the turn-indicator blinker lights of motor vehicles, especially of motorcycles, which precludes the operation of the acoustic control device when unnecessary for the driver and when otherwise annoying to other traffic participants.

A further object of the present invention resides in a circuit arrangement for the turn-indicator blinker lights of a motor vehicle, especially of a motorcycle, which obviates the need for a complicated electronic circuit to achieve the desired control effect.

A still further object of the present invention resides in a circuit arrangement for turn-indicator blinker lights of a motorcycle which automatically turns off the acoustic buzzer when the motor vehicle stands still.

Still another object of the present invention resides in a circuit arrangement of the type described above which is simple in construction as well as highly reliable in operation.

Figure 2:
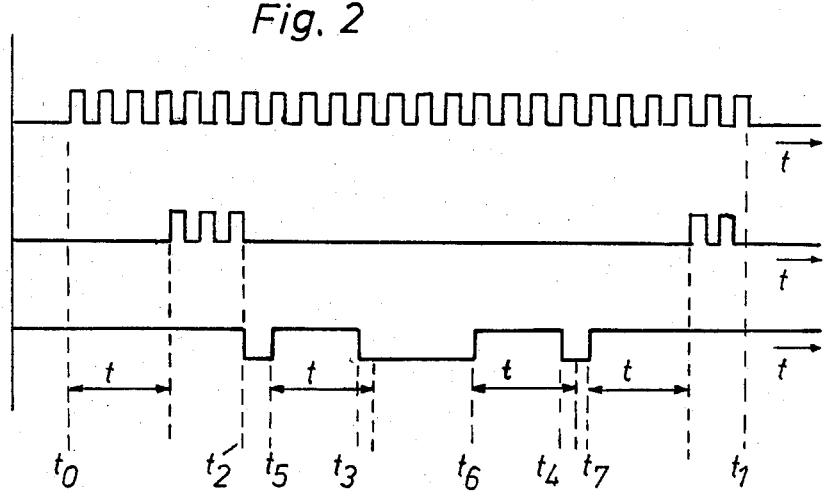

These and other objects, features and advantages of the present invention will become more apparent from the following description when taken in connection with the accompanying drawing which shows, for purposes of illustration only, one embodiment in accordance with the present invention, and wherein:

FIG. 1 is a schematic circuit diagram for the turn-indicator blinker lights of a motorcycle with an acoustic control device which according to the present invention is disconnected with an interrupted force-transmission in the motorcycle and which upon engagement of the blinker lights and upon closing of the force transmission is additionally turned-on with delay; and FIG. 2 is a wave diagram for the engagement and disengagement of the control device of FIG. 1 in dependence on the operation of the blinker lights and of the closing or the opening of the force-transmission.

Referring now to the drawing, and more particularly to FIG. 1, a turn-indicator flasher system of a motorcycle includes for an indication of a change in the driving direction toward the left or toward the right one front and one rear blinker light 1 and 2, respectively, 3 and 4 each. A flasher unit 5 includes a negative-terminal ground connection 31, a connection 49a for an electric line 7 leading to a turn-indicator switch 6, and a connection 49 for an electric line 8 leading to an ignition lock (not shown)—the coordinated connection is designated by reference numeral 15—and therewith to the positive terminal (+) of the power supply. Indicator lights 11 and 12 are coordinated to the blinker lights 1 and 2, respectively, 3 and 4.

A further line 13' leads from the positive terminal of the power supply to the connection 49a of the flasher unit 5, in which is connected a buzzer 13 an acoustic control device. A time-control switch 23 is coordinated to the buzzer 13. The time-control switch 23 includes a normally open contact 24' of a relay 24 having an energizing coil 24" in the collector circuit of a switching transistor 25 whose emitter-collector circuit leads from the positive to the negative terminal of the power supply.

The base of the switching transistor 25 is connected with the emitter of a control transistor 26 whose collector is connected by way of a resistor 27 with the positive terminal of the power supply and whose base is connected with the negative terminal of the power supply by way of a Zener diode 28 and a condenser 29.

The condenser 29 is further connected with a line 30, in which a resistor 31 is interconnected and which, in its turn; is adapted to be connected, on the one hand, by way of switch 18 and 19 with the negative terminal of the power supply and, on the other hand, by way of diodes 32 and 33 with the feed lines 34 and 35 of the blinker lights 1 and 2, respectively, 3 and 4. The switches 18 and 19 are closed with a disengaged clutch and with an engaged neutral position of the transmission, respectively.

By engagement of the left or right switching position L, respectively, R, of the turn-indicator switch 6, the blinker lights 1 and 2, respectively, 3 and 4 and the coordinated indicator light 11, respectively, 12 are selectively intermittently engaged or turned-on by way of the connection 49a of the flasher unit 5.

If, with engaged blinker lights, the force-transmission of the motorcycle is closed and if therewith the switches 18 and 19 are open, then the condenser 29 is charged in a stepwise manner corresponding to the blinker intervals by way of the line 7, the line 34 or 35, the diode 32 or 33, the line 30 and the resistance 31. Upon reaching the breakthrough voltage of the Zener diode 28 at the condenser 29, the control transistor 26 and therewith the switching transistor 25 are rendered conductive. The energizing coil 24″ of the relay 24 is energized, therewith attracting its armature, and thereby closes by means of the now closed working contact 24′ the line 13′ to the connection 49a of the flasher unit 5. With a closed force-transmission, the buzzer 13 is thus engaged only a predetermined switching time of the time-control switch 23 of, for example, five seconds after the engagement of the blinker lights 1 and 2, respectively, 3 and 4.

If, during the operation of the blinker lights 1 and 2, respectively, 3 and 4, the force-transmission is or will be interrupted, i.e., the switch 18 and/or the switch 19 is or will be closed to the negative terminal, then the condenser 29 is discharged suddenly by way of this switch or switches; the control transistor 26 and therewith the switching transistor 25 become nonconductive or remain non-conductive—insofar as the switching time of the time-control switch 23 has not yet elapsed after the engagement of the blinker lights. The energizing coil 24″ is de-energized, as a result of which the working contact 24′ is reopened and the current supply of the buzzer 13 is interrupted. The buzzer 13 is thus disconnected or turned-off with engaged blinker lights and with an interrupted force-transmission of the motorcycle.

After the closing of the force-transmission, causing reopening of the switch 18 and/or 19, and thus with an interruption of the connection of the condenser with the negative terminal by way of the switch 18 and/or 19, the condenser 29 is again charged stepwise. If the voltage at the condenser 29 exceeds the breakthrough voltage of the Zener diode 28, then the control and switching transistors 26 and 25 which had been blocked up to that time, are rendered conductive and therewith the buzzer 13 is again engaged by way of the energizing coil 24′ and the working contact 24′ which is closed upon energization of relay winding 24′. The time elapsing after re-establishing the force-transmission is equal to the switching time of the time-control switch 23 and therewith equal to the period of time which elapses after the engagement of the blinker lights with a closed force-transmission up to the engagement of the buzzer 13.

The diagram according to FIG. 2 illustrates in the upper line an assumed period of time of the engagement of the blinker lights, in the lower line an assumed progress of the closing and opening operations with respect to time of the force-transmission during this period of engagement of the turn-indicator lights, and in the center line, the development with respect to time of the periods of engagement and disengagement of the buzzer 13 resulting therefrom.

The blinker lights 1 and 2, respectively, 3 and 4 are engaged by way of the turn-indicator switch 6 at a time $t_o$ and are turned off at a time $t_1$. The flasher unit 5 produces at the output 49a between the instants of time $t_o$ and $t_1$ according to the upper line in FIG. 2, a continuous pulse sequence for the respectively engaged blinker lights, the coordinated indicator lights and the line 30.

The force-transmission of the motorcycle is interrupted during a change of driving direction to be indicated according to the lower line in FIG. 2 at the instants $t_2$, $t_3$, and $t_4$, for example, during a speed-change $t_2$ during the braking, during a stoppage $t_3$ and during a renewed speed-change $t_4$ during the starting of the drive and is again closed at the respective following instants $t_5$, $t_6$ and $t_7$. The switch 18 and/or the switch 19 are thereby closed during the interruption of the force-transmission and are opened again during the closing thereof.

After the engagement of the blinker lights $t_o$, according to the center line in FIG. 2, the buzzer 13 remains initially disengaged or turned-off for the switching time t of the time-control switch 23, for example, of five seconds. After the lapse of this time t, the buzzer 13 sounds off in opposite-phase relation to the blinker lights 1 and 2, respectively, 3 and 4 up to the interruption of the force-transmission during the speed-change at the instant $t_2$. At this time, the buzzer 13 is again disengaged or turned-off. It remains disconnected or turned-off up to the re-establishment of the force-transmission ($t_5$) by the switch 18 and/or 19 closed thereby and following the same during a period of time (t) by the time-control switch 23.

Since the period of time lying between the engagement of the transmission neutral ($t_3$) during the stoppage and the end of the preceding change-speed ($t_5$) is smaller than the switching time t of the time-control switch 23, the buzzer 13 continues to remain disengaged by the switch 18, respectively, 19 up to the end of the stoppage ($t_6$) and for the following period of time t by the time-control switch 23 triggered at this time. The interruption of the force-transmission ($t_4$) during the speed-changing in the course of the re-starting of the motorcycle and again prior to the lapse of the switching time t of the time-control switch 23, leaves the buzzer 13 disengaged or turned-off by the switch 18 and/or 19 and from the end of this change-speed ($t_7$), by the time-control switch 23 during the switching time t thereof. Only after the lapse of this switching time t, the buzzer 13 is again engaged and reminds the driver of the blinker lights which still remain engaged inadvertently with high probability.

Even though the acoustic installation remains inoperable for the most part in favor of an extraordinarily slight annoyance to the other traffic participants and bystanders, the driver will nonetheless be always reminded in each case of the engaged blinker lights when this is or becomes necessary.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A circuit arrangement for the turn-indicator blinker lights of a motor vehicle, comprising an acoustic control device coordinated to the operation of the blinker lights, characterized in that the control device is rendered inoperable by an interruption in the force-transmission of the motor vehicle, and in that a time-control switch means is operable to engage the control device with a predetermined delay after the beginning of the operation of the blinker lights with a closed force-transmission and/or after the closing of the force-transmission during the operation of the blinker lights.

2. A circuit arrangement according to claim 1, characterized in that the motor vehicle is a motorcycle.

3. A circuit arrangement according to claim 2, characterized in that the control device is a buzzer.

4. A circuit arrangement according to claim 3, characterized in that the control device is rendered inoperable by the time-control switch means by disengaging the clutch of the motor vehicle.

5. A circuit arrangement according to claim 4, characterized in that the control device is rendered inoperable by the time-control switch means by engaging the neutral position of the change-speed transmission of the motor vehicle.

6. A circuit arrangement according to claim 5, characterized in that the time-control switch means includes a condenser which is charged during the operation of the blinker lights and which is discharged with an interrupted force-transmission and whose voltage above a predetermined thereshold value controls the closing of an energizing circuit for the control device.

7. A circuit arrangement according to claim 6, characterized in that the condenser controls by way of a Zener diode as threshold switch a control transistor for a switching transistor having a collector circuit, and a control relay means for the control device and having an energizing coil, said energizing coil being operatively connected in said collector circuit.

8. A circuit arrangement according to claim 1, characterized in that the control device is rendered inoperable by the time-control switch means by disengaging the clutch of the motor vehicle.

9. A circuit arrangement according to claim 1, characterized in that the control device is rendered inoperable by the time-control switch means by engaging the neutral position of the change-speed transmission of the motor vehicle.

10. A circuit arrangement according to claim 1, characterized in that the time-control switch means includes a condenser which is charged during the operation of the blinker lights and which is discharged with an interrupted force-transmission and whose voltage above a predetermined threshold value controls the closing of an energizing circuit for the control device.

11. A circuit arrangement according to claim 10, characterized in that the condenser controls by way of a Zener diode as threshold switch a control transistor for a switching transistor having a collector circuit, and a control relay means for the control device and having an energizing coil, said energizing coil being operatively connected in said collector circuit.

* * * * *